United States Patent
Glatfelter (10) Patent No.: US 9,766,621 B2
(45) Date of Patent: Sep. 19, 2017

(54) AIRCRAFT INFORMATION RETRIEVAL USING ONBOARD RFID TAGS

(71) Applicant: The Boeing Company, Chicago, IL (US)

(72) Inventor: John William Glatfelter, West Chester, PA (US)

(73) Assignee: The Boeing Company, Chicago, IL (US)

( * ) Notice: Subject to any disclaimer, the term of this patent is extended or adjusted under 35 U.S.C. 154(b) by 71 days.

(21) Appl. No.: 14/994,076

(22) Filed: Jan. 12, 2016

(65) Prior Publication Data

US 2017/0199520 A1 Jul. 13, 2017

(51) Int. Cl.
| | |
|---|---|
| *G05D 1/00* | (2006.01) |
| *G06F 7/00* | (2006.01) |
| *G06K 7/10* | (2006.01) |
| *G05D 1/10* | (2006.01) |
| *B64C 39/02* | (2006.01) |

(52) U.S. Cl.
CPC .......... *G05D 1/0011* (2013.01); *B64C 39/024* (2013.01); *G05D 1/101* (2013.01); *G06K 7/10366* (2013.01); *B64C 2201/146* (2013.01)

(58) Field of Classification Search
None
See application file for complete search history.

(56) References Cited

U.S. PATENT DOCUMENTS

| | | |
|---|---|---|
| 2010/0063650 A1 | 3/2010 | Vian et al. |
| 2010/0235037 A1 | 9/2010 | Vian et al. |
| 2012/0136630 A1 | 5/2012 | Murphy et al. |
| 2014/0077969 A1 | 3/2014 | Vian et al. |
| 2015/0269787 A1 | 9/2015 | Kumar et al. |

FOREIGN PATENT DOCUMENTS

EP 2937756 A1 10/2015

OTHER PUBLICATIONS

European Patent Office, Extended European Search Report in European Patent Application No. 16190037.8-1871, dated Apr. 3, 2017, 8 pages.
Williams, Martyn, EasyJet Turning to Drones for Aircraft Inspections, Computerworld, URL: http://www.computerworld.com/article/2931988/emerging-technology/easyjet-turning-to-drones-for-aircraft-inspections.html, Jun. 8, 2015, 3 pages.
Golson, Jordan, EasyJet's Using Drones to Check Planes for Lightning Damage, Wired, URL: http://www.wired.com/2015/06/easyjets-using-drones-check-planes-lightning-damage/, Jun. 10, 2015, 6 pages.

*Primary Examiner* — Bhavesh V Amin
(74) *Attorney, Agent, or Firm* — Kolisch Hartwell, P.C.

(57) ABSTRACT

A method for determining information about an aircraft may include receiving at a base station an RFID tag location map for the aircraft and transmitting to an unmanned aerial vehicle (UAV) the RFID tag location map for the aircraft. The method may include generating navigation signals by the UAV based at least in part on the received RFID tag location map appropriate for controlling navigation of the UAV proximate to an RFID tag supported on the aircraft at an RFID tag location, the RFID tag having aircraft-related identifying data. The method may include receiving, by the base station, read-related data from the UAV. The read-related data may include aircraft-related identifying data when the RFID tag is at the RFID tag location. The method may include determining, at the base station from the received read-related data, information about the aircraft.

20 Claims, 5 Drawing Sheets

AIRCRAFT INFORMATION RETRIEVAL USING ONBOARD RFID TAGS

FIELD

The present invention relates generally to aircraft inspection. More specifically, the disclosed embodiments relate to systems and methods for retrieving information about an aircraft from onboard radio-frequency identification (RFID) tags.

BACKGROUND

Aircraft configurations can change during fabrication for a number of reasons. As an aircraft proceeds down an assembly line the design of the aircraft may change. These design changes may be the result of engineering design changes, the availability of new construction kits, changing customer requirements, Federal directives inducing modifications, security upgrades, or other factors. Thus, the "as-built" configuration of a completed aircraft may be difficult to determine, with the difficulty increasing with increasing complexity of the aircraft. Further, the as-built configuration may not match any of the potentially multiple versions of the intended design specifications or desired configurations. Once built, aircraft configurations change during maintenance due to repair or upgrade of aircraft components.

Current solutions to this problem involve visual inspection of key components and parts. The parts may be difficult to access and the visual inspection process may be time-consuming and prone to error. For example, a visual inspection may require scaffolding and safety equipment to physically reach and/or access some components. These physical configuration retrievals performed manually can lead to human transcription errors, such as when there are distractions during the inspection process. Other solutions may involve manual investigation into records that were kept during construction, a potentially tedious process. Further, these records may have been kept by multiple vendors and may be otherwise unreliable. Without an accurate up-to-date configuration, those using the as-built or as-maintained configuration will be further challenged to perform maintenance and acquire accurate spare part inventory.

SUMMARY

An aircraft survey system for determining information about an aircraft may include an unmanned aerial vehicle (UAV) and a base station. The UAV may have a radio-frequency identification (RFID) reader, a UAV controller, and a UAV transceiver. The RFID reader may be configured to read an RFID tag supported on the aircraft at an identified location and the RFID tag may have aircraft-related identifying data. The UAV controller may be configured to receive an RFID tag location map for the aircraft and generate navigation signals based at least in part on the RFID tag location map for navigating proximate to the identified location. The UAV transceiver may be configured to communicate with the UAV controller and may receive and transmit data wirelessly. The base station may include a communication system, a base-station controller operatively coupled to the communication system, and a data storage device operatively coupled to the base-station controller. The communication system may be configured to communicate wirelessly with the UAV. The base-station controller may be configured to receive and transmit to the UAV the RFID tag location map for the aircraft. The base-station controller may further be configured to receive read-related data from the UAV. The read-related data may include aircraft-related identifying data when the RFID tag is at the RFID tag location. The base-station controller may be configured to determine from the received read-related data information about the aircraft.

A method for determining information about an aircraft may include receiving at a base station an RFID tag location map for the aircraft and transmitting to a UAV the RFID tag location map for the aircraft. The method may include generating navigation signals by the UAV based at least in part on the received RFID tag location map appropriate for controlling navigation of the UAV proximate to an RFID tag supported on the aircraft at an RFID tag location, the RFID tag having aircraft-related identifying data. The method may include receiving, by the base station, read-related data from the UAV. The read-related data may include aircraft-related identifying data when the RFID tag is at the RFID tag location. The method may include determining, at the base station from the received read-related data, information about the aircraft.

A computer program product may include a first computer readable storage medium having a first set of computer readable program instructions embodied therewith and a second computer readable storage medium having a second set of computer readable program instructions embodied therewith. The first set of computer readable program instructions, when executed by a first processor of a base station, may configure the base station to receive an RFID tag location map for the aircraft and transmit the RFID tag location map for the aircraft to a UAV. The first set of computer instructions may further configure the base station to receive read-related data from the UAV, the read-related data including aircraft-related identifying data when an RFID tag is at an RFID tag location and determine, from the received read-related data, information about the aircraft. A second set of computer readable program instructions, when executed by a second processor of the UAV, may configure the UAV to receive the RFID tag location map from the base station and generate navigation signals based at least in part on the received RFID tag location map. The navigation signals may be appropriate for controlling navigation of the UAV proximate to an RFID tag supported on the aircraft at an RFID tag location, and the RFID tag may have the aircraft-related identifying data.

The present disclosure provides various apparatuses, systems, methods of use, and computer program products. In some embodiments, a system may include a UAV and a base station, the system configured to determine information about an aircraft. In some embodiments, a system may determine information about an aircraft at least partially autonomously.

Features, functions, and advantages may be achieved independently in various embodiments of the present disclosure, or may be combined in yet other embodiments, further details of which can be seen with reference to the following description and drawings.

DESCRIPTION

Overview

Various embodiments of an aircraft survey system having an UAV and a base station and associated method are described below and illustrated in the associated drawings. Unless otherwise specified, the aircraft survey system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other inspection systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Aspects of an aircraft survey system may be embodied as a computer method, computer system, or computer program product. Accordingly, aspects of the aircraft survey system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the aircraft survey system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof.

A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the aircraft survey system may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), or a Bluetooth wireless connection, and/or the connection may be made to an external computer (for example, through the Internet using an Internet Service Provider).

Aspects of the aircraft survey system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the aircraft survey system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary aircraft survey systems as well as related methods and/or computer program products. The examples in these sections are intended for illustration and should not be interpreted as limiting the entire scope of the present disclosure. Each section may include one or more distinct inventions, and/or contextual or related information, function, and/or structure.

Example 1

Figure 1:
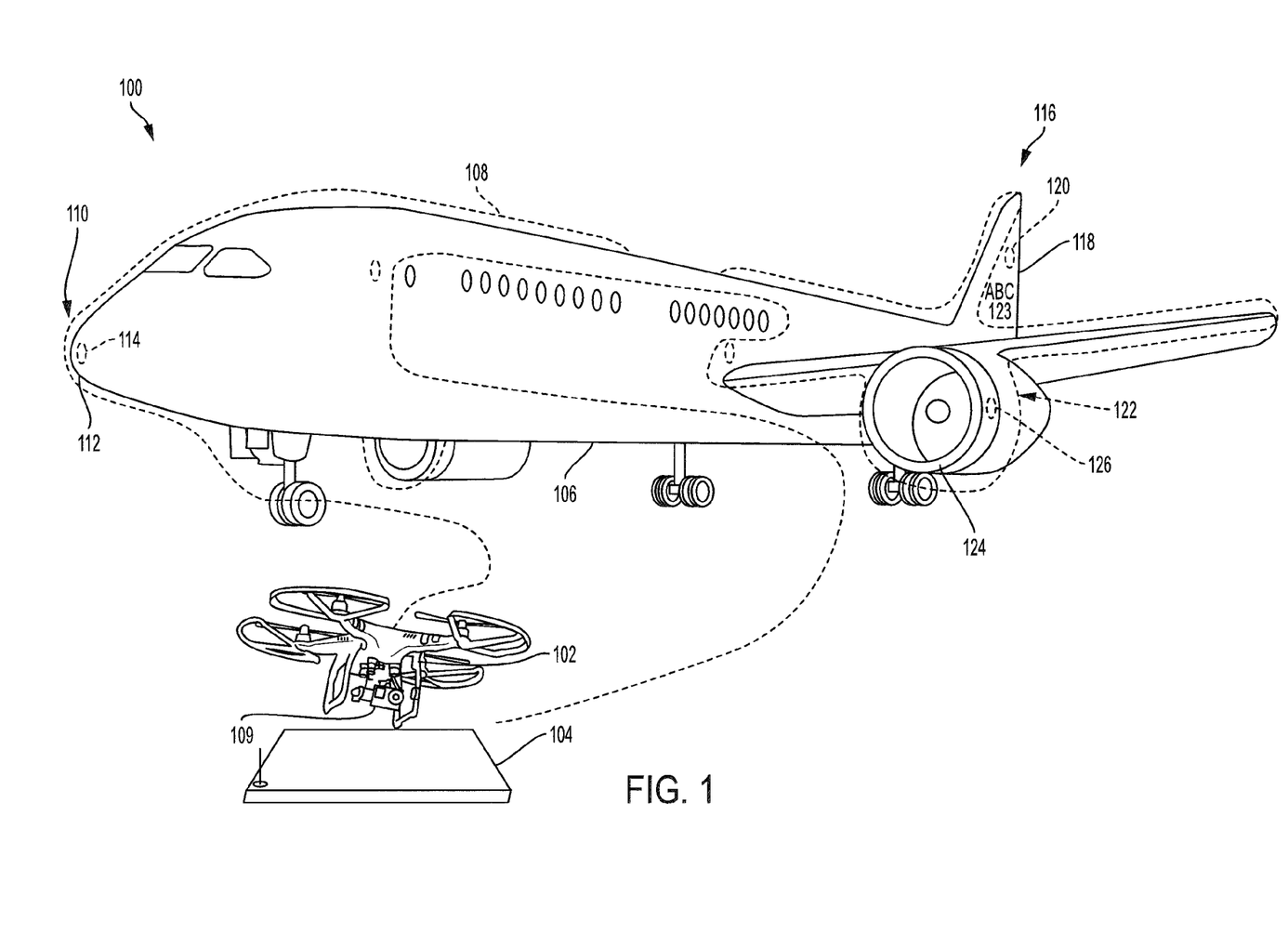
FIG. 1 is a schematic view of an aircraft survey system including an exemplary unmanned aerial vehicle (UAV) and an exemplary base station, showing an exemplary survey route for the UAV proximate an aircraft.

This example describes an illustrative aircraft survey system, see FIG. 1. FIG. 1 is a schematic view of an aircraft survey system, generally indicated at 100. Aircraft survey system 100 may include an unmanned aerial vehicle (UAV) 102 and a base station 104. UAV 102 may be in wireless communication with the base station. Aircraft survey system 100 may be configured to inspect or survey an aircraft 106. The UAV may fly along a survey route 108 proximate the aircraft. UAV 102 may include one or more sensors 109, such as a visible-light camera, a proximity detector, a radio-frequency identification (RFID) reader, or other appropriate sensors. When activated, the UAV may use one of the sensors, such as the camera or the proximity detector, to detect the aircraft that is closest to the base station. The UAV may be configured to record one or more images of the aircraft and transmit signals representative of the image to the base station. The base station may be configured to identify a model and/or a registration number of the aircraft from the image signals received from the UAV. For example, the image may include an image of at least a portion of the aircraft having aircraft identification indicia. That is, the aircraft may have letters and/or numbers identifying the aircraft written on, for example, the tail or the fuselage of the aircraft. In another example, where there is not aircraft identification indicia on an exterior of the aircraft, the base station may have access to a database including three-dimensional configurations of a plurality of aircraft. The base station may thus recognize the model of the aircraft from the one or more images of the exterior of the aircraft. The database to which the base station has access may include predetermined survey routes for a plurality of aircraft.

Once the base station has identified the aircraft to be surveyed, the base station may transmit the appropriate survey route 108 to the UAV. The base station may transmit the survey route that includes a RFID tag location map to the UAV, the RFID tag location map including identified locations of one or more RFID tags relative to the identified aircraft 106. The UAV may have an onboard UAV controller including a processor and a storage device. The UAV controller may store the survey route 108 and/or the RFID tag location map in the storage device and may generate navigation signals to drive one or more propellers of the UAV appropriate for navigating along the survey route 108.

UAV 102 may have a radio-frequency identification (RFID) reader. The RFID reader may be configured to read one or more RFID tags supported on the aircraft 106 at one or more identified locations. The RFID tags may have aircraft-related identifying data. For example, an RFID tag supported by the aircraft may have aircraft-related identifying data such as a make and model of the aircraft itself. In another example, an RFID tag may be disposed proximate a specific part, assembly, component, or system of the aircraft and the aircraft-related identifying data may be related to the specific part, assembly, component, or system.

For the RFID reader to read an RFID tag, the UAV 102 may navigate proximate to the identified location of the RFID tag. The UAV may navigate along the survey route 108 to a position proximate the identified location of the RFID tag. Survey route 108 may be a continuous path which may begin at the base station 104 and which may end at the base station 104. Alternately, the survey route may begin and/or end at locations fixed relative to the aircraft 106 itself. For example, the survey route may include a first location 110 proximate a nose 112 of the aircraft, which location may include a first RFID tag 114. The UAV may proceed along the survey route to a plurality of locations proximate the identified locations of the one or more RFID tags. For example, the survey route 108 may include a second location 116 proximate a tail 118 of the aircraft which may include a second RFID tag 120, and a third location 122 proximate an engine 124 of the aircraft which may include a third RFID tag 126, etc.

The UAV reader of the UAV 102 may "read" the one or more RFID tags by receiving aircraft-related identifying data from the one or more RFID tags. The UAV may need to be near the relevant RFID tag in order for the UAV reader to read it. The UAV may transmit data wirelessly to the base station 104.

The base-station controller may be configured to determine, from the data received from the UAV 102, information about the aircraft. This information may relate to the current configuration of the aircraft. The base-station controller may then compare the information about the current configuration of the aircraft to information regarding a desired configuration of the aircraft. The aircraft survey system may generate an output or report regarding the current configuration of the aircraft. If there are any discrepancies between the current and desired configurations, the aircraft survey system may generate an output or report to be sent to a user notifying the user of the discrepancy. The output or report may also include a recommendation such as replacing a part or inspecting a part. The base-station controller may generate an output for a display device to display an alert to a user, or to display instructions to the user for replacing an installed part or inspecting the part.

Example 2

Figure 2:
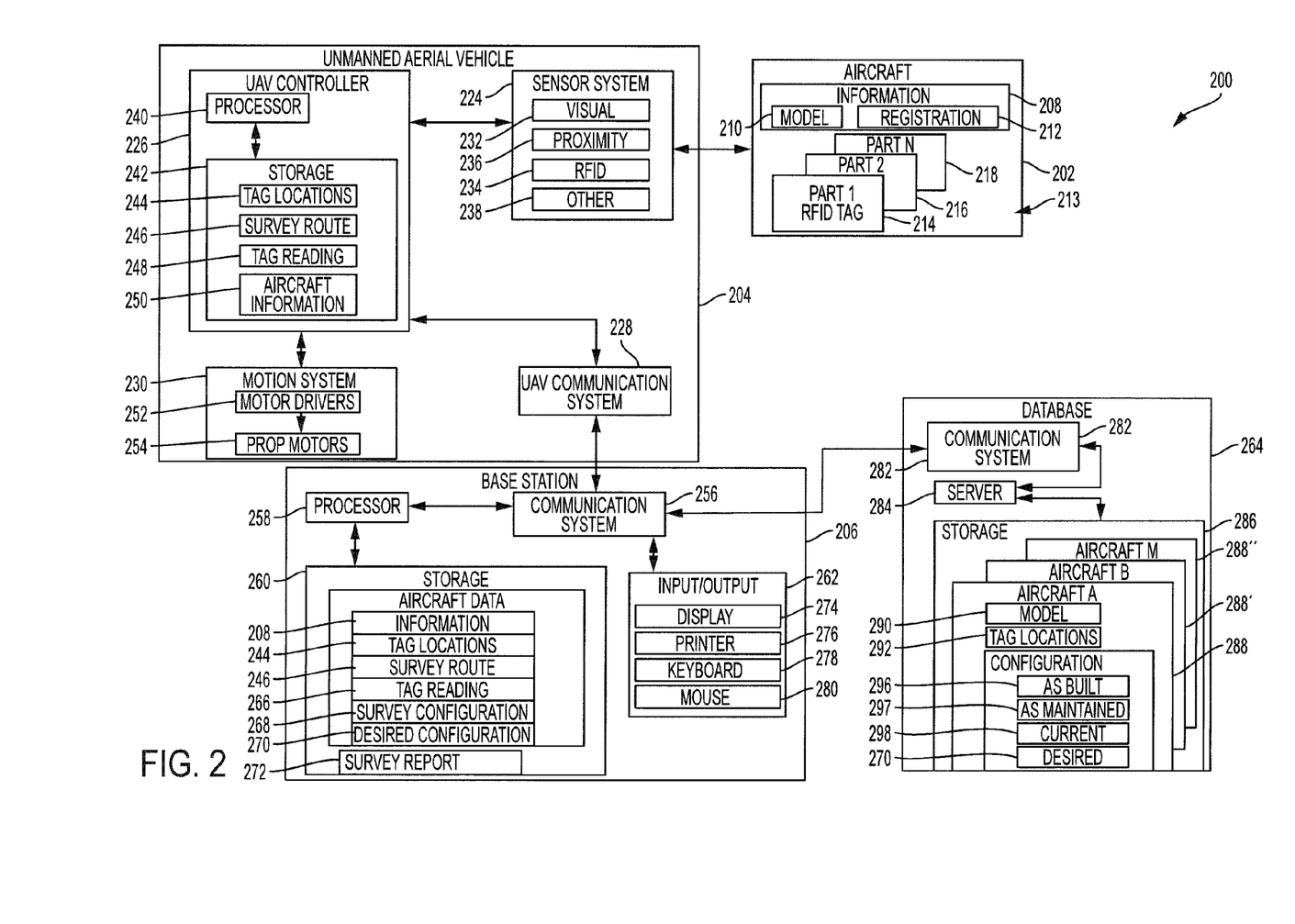
FIG. 2 is a block diagram of another illustrative aircraft survey system.

This example describes another illustrative aircraft survey system, see FIG. 2. FIG. 2 is a block diagram of an aircraft survey system generally indicated at 200. Aircraft survey system 100 described above may be an embodiment of aircraft survey system 200. Aircraft survey system 200 may be configured to determine information about an aircraft 202. Aircraft survey system 200 may include an unmanned aerial vehicle (UAV) 204 and a base station 206.

Aircraft 202 may include information 208, for example model-type identifying data 210 associated with an aircraft model type and/or a registration number 212. Information 208 may be visibly displayed, for example, as aircraft identification indicia on a tail of the aircraft, on a wing of the aircraft, or on a portion of a fuselage of the aircraft.

Information 208 may alternately be encoded into a radio-frequency identification (RFID) tag disposed on the aircraft.

Aircraft 202 may include one or more RFID tags 213 supported on the aircraft. One or more of the RFID tags may be associated with a part, component, assembly, or system of the aircraft. The RFID tags may include aircraft-related identifying data. For example, aircraft 202 may include a first RFID tag 214 associated with a first part, a second RFID tag 216 associated with a second part, an Nth RFID tag 218 associated with an Nth part, etc. The parts may be distributed throughout the aircraft and each RFID tag associated with a particular part may be disposed at an identified location proximate the associated part.

The RFID tags, 214, 216, etc., may be passive low-frequency tags, which may have a read range of up to three feet. Alternately, the RFID tags may be passive ultra-high-frequency (UHF) transponders, which may have a read range up to fifteen or twenty feet. Unless being read by a RFID reader, the RFID tags may be substantially inert. The RFID tags need not be visible from outside the aircraft 202. The read range of any individual RFID tag may depend on the disposition of the RFID tag relative to an outside surface of the aircraft, the components of the aircraft between the RFID tag location and the exterior surface, and the materials used for an exterior skin of the aircraft, among others.

Unmanned aerial vehicle 204 may have a sensor system 224, a UAV controller 226, a UAV communication system 228, and a motion system 230. Sensor system 224 may have a plurality of sensors configured to perform a plurality of functions. For example, sensor system 224 may include one or more visual sensors 232 such as a visible-light camera. The camera may be used to record an image of at least a portion of the aircraft having aircraft identification indicia, for example information 208.

Sensor system 224 may include a RFID reader 234. The RFID reader may be configured to read RFID tags, such as RFID tags 214, 216, etc., supported on the aircraft at identified respective locations and having respective aircraft-related identifying data. After attempting to read an RFID tag, the RFID reader may generate read-related data associated with the RFID tag, and/or the part associated with the RFID tag, and/or the aircraft itself. In some cases, the RFID reader may register that no RFID tags are disposed at an identified location and may generate read-related data corresponding to the absence of an RFID tag.

Sensor system 224 may include other sensors, such as a proximity detector 236 which may be configured to determine a distance from the UAV to the nearest object. Other sensors that the sensor system may include are, for example, a video camera, an infrared camera, any other sensor configured to detect electromagnetic signals from frequency ranges besides the visible and radio-frequency ranges, or sensors configured to detect sound waves. These other possible sensors are indicated generally at 238 in FIG. 2.

UAV controller 226 may include a processor 240 and a storage device 242. UAV controller 226 may be operatively coupled to the sensor system 224. UAV controller 226 may be any appropriate data processing system, such as the example described below with reference to FIG. 5. In particular, storage device 242 may be configured to store such information as an RFID tag location map 244 including one or more RFID tag locations, a survey route 246, one or more RFID tag readings 248, and/or any relevant aircraft information 250.

The RFID tag location map 244 may include the identified locations of the one or more RFID tags 214, 216, etc., relative to the aircraft 202. The survey route 246 may be a route through space proximate the aircraft along which the UAV 204 is configured to travel. The survey route may be proximate the RFID tag locations 244 among other locations, and may be configured to avoid contact with the aircraft while progressing along the survey route. The RFID tag location map and the survey route may be received by the UAV 204 from the base station 206. The RFID tag readings 248 may be aircraft-related data generated by the RFID sensor 234. Where the RFID tag is associated with a component of the aircraft, the RFID reading may be component-identifying data. The aircraft information 250 may correspond to information 208 and may correspond to data generated by the visual sensor 232.

UAV 204 may include a UAV communication system 228 which may be configured to communicate with the UAV controller 226. The UAV communication system 228 may be configured to receive and transmit data wirelessly. For example, the UAV communication system 228 may be configured to communicate wirelessly with the base station 206. The UAV communication system 228 may include a UAV transceiver.

The motion system 230 of the UAV 204 may include one or more motor drivers 252 configured to drive one or more respective propeller motors 254. The UAV controller 226 may be configured to generate navigation signals based at least in part from the received RFID tag location map 244 for controlling navigation of the UAV 204 to the plurality of RFID tag locations sequentially. The motor drivers 252 may independently respond to control signals from the UAV controller 226 and convert those control signals into driving signals that can drive the respective one or more propeller motors 254. In some cases, UAV 204 may have a number of propellers, for example four propellers. By adjusting the driving signals provided to each propeller motor 254, the power output of each propeller may be adjusted. By adjusting the power output of each propeller, the attitude, position, and trajectory of the UAV 204 may be controlled to navigate the UAV 204 to one or more identified locations.

Figure 5:
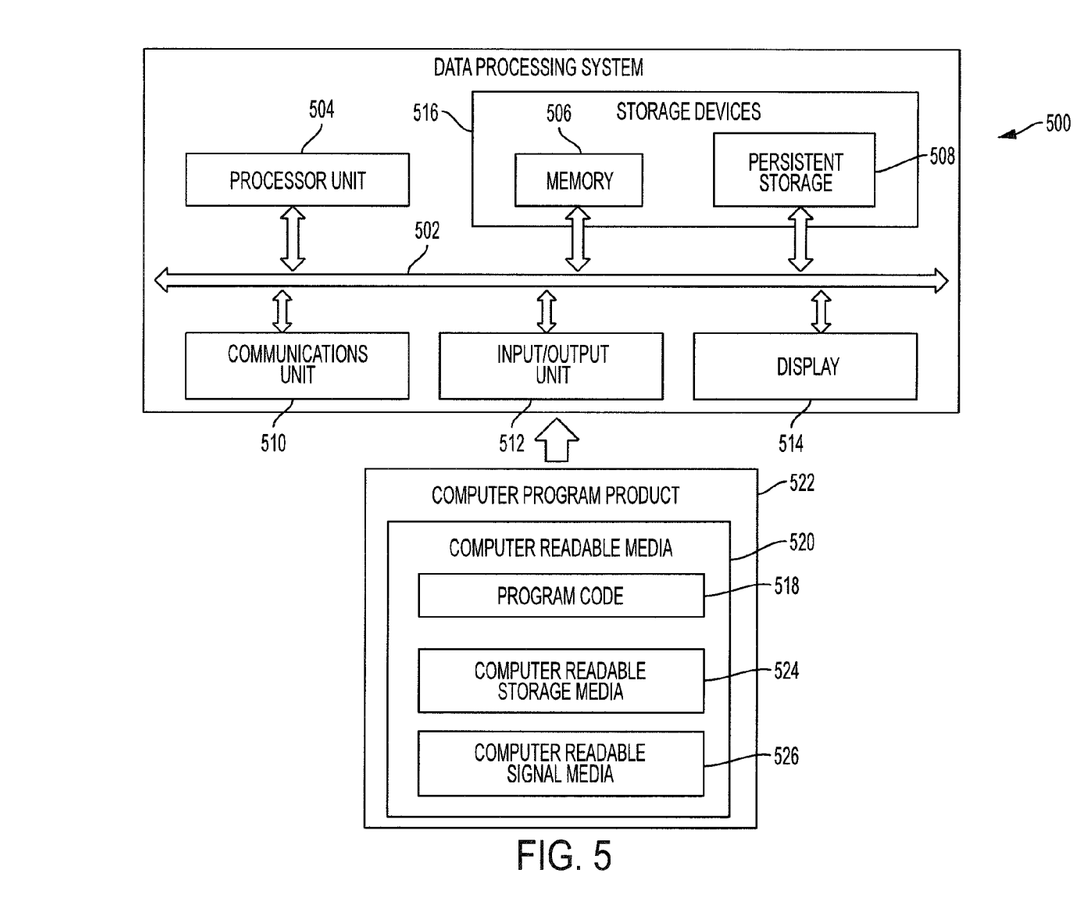
FIG. 5 is a schematic diagram of various components of an exemplary data processing system.

Base station 206 may perform some or all of the functions of a data processing system, for example as described in reference to FIG. 5. Base station 206 may include a communication system 256, a base-station controller or processor 258, a data storage device 260, and an input/output (I/O) interface 262. The base-station controller 258 may be operatively couple to the communication system 256 and the data storage device 260. The communication system 256 may be configured to communicate wirelessly with the UAV 204. That is, the communication system 256 may be configured to send data to the UAV 204 and receive data from the UAV 204. Communication system 256 may also be configured to communicate to a database 264.

The base-station controller 258 may be configured to receive, via communication system 256, image signals representing images of at least a portion of the aircraft 202 from the UAV 204. The image signals may include aircraft-related identifying data. The base station controller 258 may be configured to identify the model and registration number of the aircraft 202 from the image signals received from the UAV 204. The aircraft-related identifying data may include model-type identifying data associated with an aircraft model type. The base-station controller 258 may be configured to determine the model type of the aircraft 202 from the model-type identifying data. The model and registration number may be stored as information 208 in the storage device 260.

The base-station controller 258 may be configured to receive the RFID tag location map 244 for the aircraft, for example from database 264 or through user input through the I/O interface 262, and may store the RFID tag location map 244 in the storage device 260. The base-station controller 258 may be configured to receive the survey route 246 for the aircraft 202, for example from database 264 or through user input through the I/O interface 262, and may store the survey route in the storage device 260. The base-station controller may be configured to transmit to the UAV either or both of the RFID tag location map for the aircraft and the survey route associated with the aircraft.

The base-station controller 258 may be configured to receive read-related data 266 from the UAV 204 which may include aircraft-related identifying data when the RFID tag 213 is at the RFID tag location. The base-station controller may be configured to store the read-related data 266 in the storage device 260. The aircraft-related identifying data may be component-identifying data corresponding to an identity of a component installed on the aircraft. The base-station controller may be configured to determine, from the received read-related data, information about the aircraft.

The base-station controller 258 may determine a survey or current configuration 268 of the aircraft 202. The survey configuration 268 may include aircraft-related identifying data 266 from the RFID tags 213 which were read by the RFID reader 234 of the UAV 204. The survey configuration 268 may include data indicating that an RFID tag was not read at an identified location where an RFID tag was expected based on the RFID tag location map. The survey configuration 268 may be stored in the storage device 260. The survey configuration 268 may include a multi-component list, where a first component of an item in the list is an identified location of an RFID tag 213 and a second component of an item in the list is an identification number corresponding to the part that is installed at the identified location.

The base-station controller 258 may be configured to receive desired configuration data 270 for the aircraft 202. The desired configuration data 270 may include desired configuration data 270 for each RFID tag location 244 on the aircraft 202. For example, a Federal regulation may require a certain component to be installed on aircraft 202 and the desired configuration data 270 may include data associated with an RFID tag 213 corresponding to that component. The desired configuration data 270 may be stored in the storage device 260. The desired configuration data 270 may include a multi-component list, where a component of an item in the list is an identified location of an RFID tag 213 and a second component of an item in the list is an identification number corresponding to the part that is desired at the identified location.

The base-station controller 258 may determine whether the component-identifying data 266 received from the UAV 204 corresponds to a component that matches the desired configuration data 270. The base-station controller 258 may make this determination by comparing the survey configuration 268 of the aircraft 202 to the desired configuration data 270.

The base-station controller 258 may be configured to generate a survey report 272. The survey report 272 may include an output identifying the component if the component-identifying data corresponds to a component that does not match the desired configuration data. For example, a particular part, with a particular RFID tag 213, may be required at an identified location and, instead, a different part, with a correspondingly different RFID tag 213, is actually installed at the identified location. Thus, the installed part corresponding with the component-identifying data associated with the installed part may not match the desired configuration data of the required part.

In another example, the UAV controller 226 may transmit to the base station 206 data indicating that no component-identifying data was read at the RFID tag location. This may be the result of a missing part or a part with a malfunctioning RFID tag. In this case, the base-station controller 258 may generate an output identifying the desired configuration data for the RFID tag location. That is, the survey report 272 may include an output indicating what part or component ought to be installed at the relevant location. The base-station controller may generate an output for a display device 274 to display at least a portion of the survey report 272, to alert an operator and display instructions to the operator for replacing the installed part with the part or component that should be installed in the relevant location.

The survey report 272 may include an output indicating that the component-identifying data for an identified location does correspond to a particular component that matches the desired configuration data for that identified location. The survey report may be stored in the data storage device 260 of the base station 206.

Figure 4:
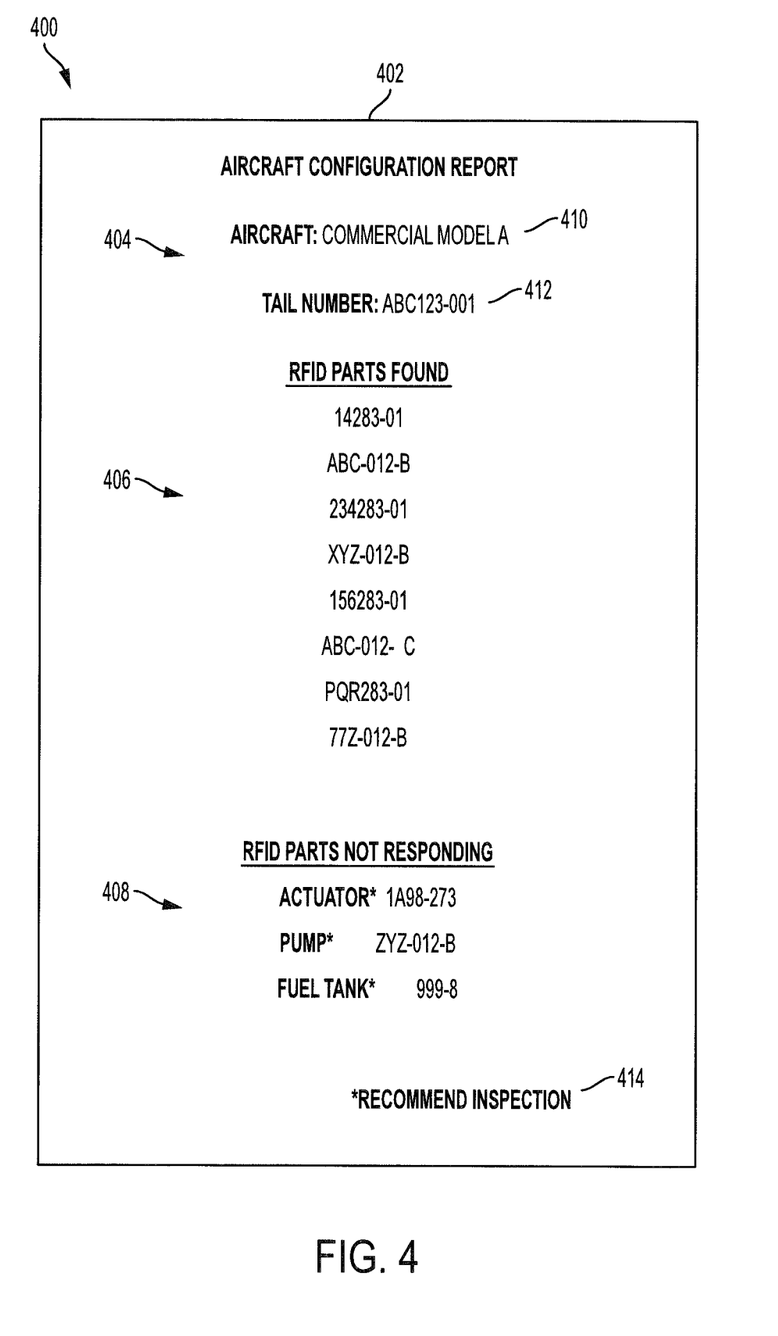
FIG. 4 is an exemplary output displayed to a user depicting exemplary results of an aircraft survey.

The base-station controller 258 may deliver the survey report 272 to a user through the I/O interface 262 of the base station 206, for example via a display 274 or a printer 276. Display 274 and/or printer 276 may be disposed at the base station 206 or at another location and may communicate with the base-station controller 258 through wired or wireless technology. An exemplary display of an exemplary survey report 272 is depicted in FIG. 4 and described below.

I/O interface 262 may include various input mechanisms, such as a keyboard 278 or a mouse 280. These may allow a user to send signals or commands to the base station 206, the UAV 204, or to database 264.

Database 264 may perform some or all of the functions of a data processing system, for example as described in reference to FIG. 5. Though depicted as separate in FIG. 2, base station 206 and database 264 may be part of a combined base station assembly. Database 264 may include a communication system 282, a server 284, and a storage device 286. Communication system 282 may be configured to communicate with the communication system 256 of the base station 206, with either wired or wireless communication, directly or via a network. Server 284 may be operatively coupled to the communication system 282 and the storage device 286.

The storage device 286 of the database 264 may include database aircraft information, indicated at 288, 288', 288", etc., specific to a plurality of different aircraft, indicated as Aircraft A, Aircraft B, Aircraft M, etc. For example, database aircraft information 288 corresponding to aircraft A may include a model type 290, an RFID tag location map 292, and various configuration data 294. The configuration data may include an initial as-built configuration 296 of the aircraft as it was initially designed and constructed. Configuration data 294 may also include as-maintained data 297 which may correspond to changes that were made to aircraft A subsequent to the initial design, perhaps during a maintenance cycle. Further included may be a current configuration 298 resulting from the current aircraft survey, which may correspond to the latest available configuration data for installed components, and desired configuration data 270.

Example 3

Figure 3:
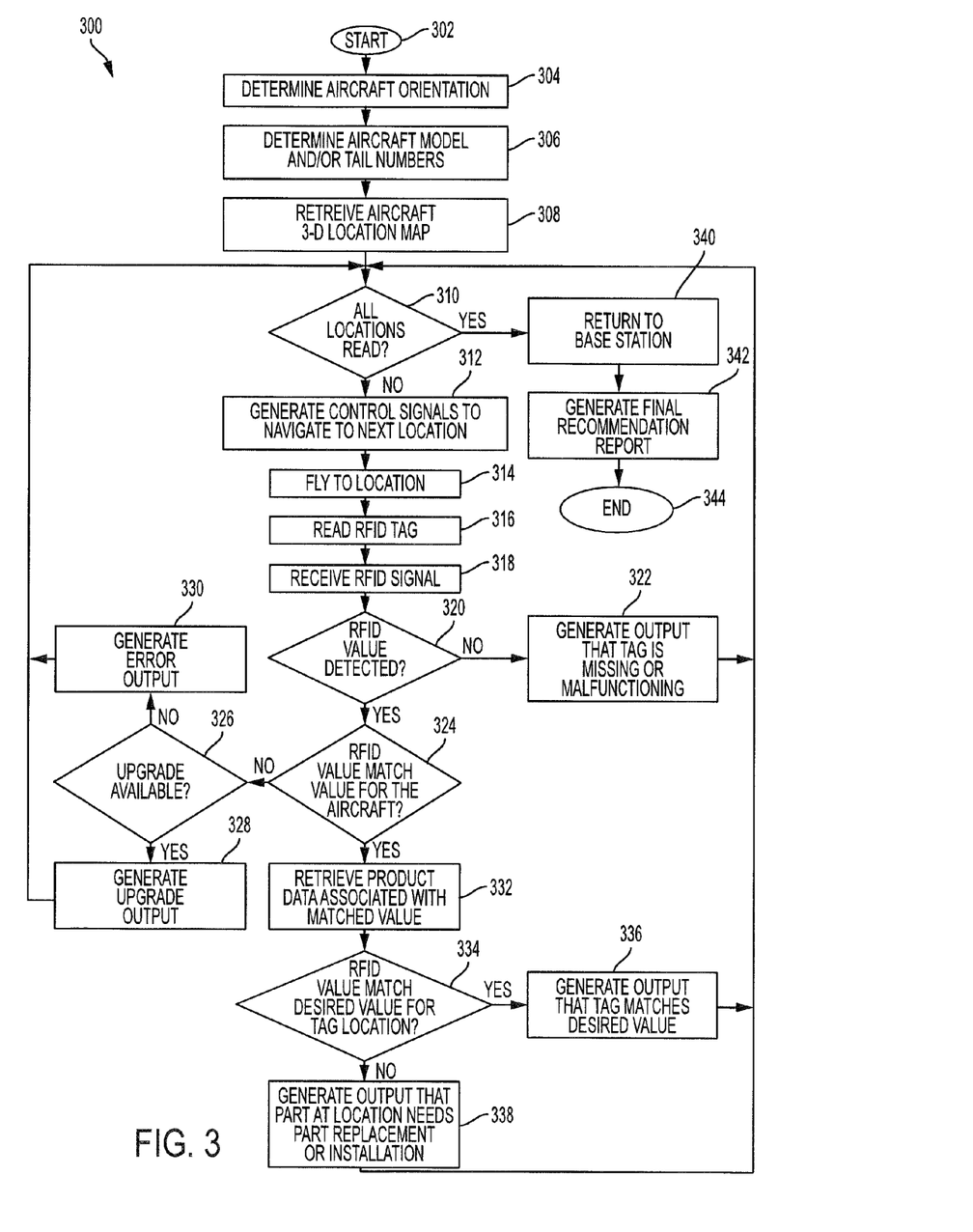
FIG. 3 is an illustration of operations performed in an example of determining information about an aircraft.

This example describes an exemplary set of operations performed in determining information about an aircraft, see FIG. 3. FIG. 3 is an illustration of operations, generally indicated at 300, which may be performed in a method of determining information about an aircraft. Some or all of operations 300 may be performed by a base station of an aircraft survey system, such as base station 104 of aircraft survey system 100 or base station 206 of aircraft survey system 200. Some or all of operations 300 may be performed by an unmanned aerial vehicle (UAV) of an aircraft survey system, such as UAV 102 or UAV 204. Some or all of operations 300 may be performed in the circuitry of a first processor of the base station, where the first processor may execute a first set of computer readable program instructions. Some or all of operations 300 may be performed in the circuitry of a second processor of the UAV, where the second processor may execute a second set of computer readable program instructions. Operations 300 may be performed by the aircraft survey system in an aircraft hangar or other protected environment.

Operations 300 may be performed by components of any of the aircraft survey systems depicted and described in reference to FIGS. 1 and 2. Although various steps of operations 300 are described below and depicted in FIG. 3, the steps need not necessarily all be performed, and in some cases may be performed in a different order than the order shown.

Operations 300 may begin at step 302. Relating operations 300 to aircraft survey system 200, the UAV 204 and the base station 206 may be activated at step 302 and the aircraft survey system 200 may locate the aircraft 202 nearest to a current location of the base station 206 or the UAV 204. The aircraft survey system 200 may locate the aircraft 202 by using sensors 236 or cameras 232 disposed on the UAV 204, after which the sensor data or camera images may be analyzed by either the UAV 204 or the base station 206. The UAV 204 and the base station 206 may communicate wirelessly. Once the UAV 204 and the base station 206 have been activated, the aircraft survey system 200 may proceed autonomously or automatically with no input from a user.

Operations 300 may include a step 304 of determining the aircraft orientation. Step 304 may be performed by the first processor 258 of the base station 206 or the second processor 240 of the UAV 204 and may depend upon an image of the aircraft 202. Once the aircraft orientation has been determined, the second processor 240 of the UAV 204 may generate navigation signals appropriate for navigating the UAV 204 along the aircraft 202 and control signals appropriate for controlling operation of an onboard visible-light camera 232 to record an image of at least a portion of the aircraft 202 having aircraft information 208, such as identification indicia displayed proximate the tail, fuselage, or wing of the aircraft. The UAV 204 may then transmit signals representative of the image to the base station 206. The base station 206 may receive the image signals from the UAV 204.

Operations 300 may include a step 306 of determining aircraft model and/or tail numbers. Step 306 may be performed by the first processor 258 of the base station 206 or the second processor 240 of the UAV 204. The first processor 258 may determine the model and registration number of the aircraft 202 from the image signals received from the UAV 204.

Operations 300 may include a step 308 of retrieving an RFID tag location map 244 for the aircraft 202. The RFID tag location map 244 may be sent by a database and received at the base station 206. The RFID tag location map 244 may include a plurality of RFID tag locations relative to the aircraft 202. The base station 206 may then transmit the RFID tag location map 244 for the aircraft 202 to the UAV 204.

The base station 206 may receive a predetermined survey route 246 appropriate for the identified aircraft 202. The survey route 246 may be proximate the RFID tag locations 244. The base station 206 may transmit the survey route 246 to the UAV 204, which may then autonomously proceed along the survey route 246. Alternately, the base station 206 may generate and transmit navigation signals to the UAV 204 for controlling the trajectory of the UAV 204 along the survey route 246.

Once the aircraft model-type and registration numbers have been determined at step 306, the base station 206 may receive desired configuration data for the aircraft 202. The base station 206 may receive desired configuration data for each of the plurality of RFID tag locations 244. The desired configuration data may be stored in memory or a data storage device 260 at the base station 206. Once the UAV 204 has completed the survey of the aircraft 202, the desired configuration data 270 may be compared by the first processer 258 of the base station 206 to the current survey configuration data 268 determined by the UAV 204.

Following step 308, operations 300 may enter a feedback loop beginning with a step 310 of determining if all of the RFID tag locations 244 have been read. That is, the second processor 258 of the UAV 204 may determine if the UAV 204 had travelled to positions proximate all of the RFID tag locations 244 in the stored RFID tag location map. If the second processor determines that the UAV has not been to all of the RFID tag locations 244, then operations 300 may proceed to step 312.

Operations 300 may include a step 312 of generating control signals to navigate to the next location. In the case where the UAV 204 is proceeding autonomously, step 312 may be performed by the second processor 240 of the UAV 204. In the case where the UAV 204 is being controlled by the base station 206, step 312 may be performed by the first processor 258 of the base station 206. The control signals may be navigation signals and may be generated, at least in part, based on the received RFID tag location map and/or the received survey route. The signals may be appropriate for controlling navigation of the UAV 2045 proximate to the next RFID tag 213 supported on the aircraft 202 at the next RFID tag location.

Operations 300 may include a step 314 of flying to the next location. Step 314 and step 312 may be performed substantially simultaneously. Thus, the UAV 204 may travel sequentially from proximate one RFID tag location to the next until all RFID tag locations 244 have been visited.

Operations 300 may include a step 316 of reading an RFID tag 213. Reading the RFID tag 213 may be performed by the UAV 204, in particular, by the RFID reader 234 on board the UAV 204 with the RFID reader signals interpreted by the second processor 240 of the UAV 204. The RFID tag 213 may be read by the UAV 204 once the UAV 204 is within a read range of the RFID tag 213 as the UAV 204 proceeds along the survey route 246.

Operations 300 may include a step 318 of receiving an RFID signal. The RFID signal may be generated by the RFID reader 234 on the UAV 204 in response to an RFID tag 213 at a RFID tag location. The RFID signal may include read-related data which may include aircraft-related identifying data. The aircraft-related identifying data may include data corresponding to the model-type of the aircraft 202 and/or the registration number of the aircraft 202. The aircraft-related identifying data may be component-identifying data corresponding to an identity of a component installed on the aircraft 202 proximate the RFID tag location. The RFID signal may include read-related data indicating that no component-identifying data was read at the RFID tag location.

The RFID signal may be received by the second processor 240 of the UAV 204. In some cases, the UAV 204 may transmit the RFID signal to the base station 206 and the base station 206 may receive the RFID signal. The UAV 204 may transmit the RFID signal to the base station 206 from a position proximate the RFID tag location. Alternately, the UAV 204 may store the RFID signal and transmit it to the base station 206 after the UAV 204 has returned to the base station. In this case, operations 300 may return to step 310.

Operations 300 may include a step 320 of determining if and RFID value has been detected. The RFID value may be a serial number or other identification number associated with a part, component, assembly, or system of the aircraft, or a code that can be correlated to an associated component. The RFID value may include data corresponding to the aircraft 202 itself and may include data corresponding to the specific component associated with the RFID tag 213 at the RFID tag location. The RFID value may include the read-related data described in reference to step 318. Step 320 may be performed by the second processor 240 of the UAV 204. Alternately, the UAV 204 may transmit a signal to the base station 206 where the first processor 258 of the base station 206 may perform step 320. In the case where no RFID value is detected, operations 300 may proceed to step 322. In the case where a RFID value is detected, operations 300 may proceed to step 324.

Operations 300 may include a step 322 of generating an output that an RFID tag is missing or malfunctioning. Step 322 may be performed by the first processor 258 of the base station 206, which may generate an output identifying the desired configuration data for the RFID tag location when the read-related data indicates that no component-identifying data was read at the RFID tag location. Following step 322, operations 300 may return to step 310.

Operations 300 may include a step 324 of determining if the RFID value corresponds to a component that matches a component associated with a value for the aircraft 202. Step 324 may be performed by the first processor 258 of the base station 206. Determining if the RFID value corresponds to a value for the aircraft may include determining whether the component-identifying data received from the UAV 204 matches the desired configuration data. In some cases the RFID value may not correspond to a value for the aircraft and operations 300 may proceed to step 326. For example, the RFID value may not be recognized by the first processor 258 of the base station 206 or the RFID value may be recognized but may correspond to an obsolete part.

Operations 300 may include a step 326 of determining if an upgrade is available for the component associated with the RFID tag 213 at the RFID tag location. If an upgrade is available, operations 300 may proceed to a step 328 of generating an upgrade output and return to step 310. If an upgrade is not available, operations 300 may proceed to a step 330 of generating an error output message and return to step 310. Steps 326, 328, and 330 may be performed by the first processor 258 of the base station 206.

If the RFID value is determined to correspond to a component for the aircraft, operations 300 may proceed from step 324 to a step 332 of retrieving product data associated with the RFID value. The product data may correspond to the desired configuration data for the aircraft 202 and may be retrieved by the base station 206 or the first processor 258 of the base station 206.

Operations 300 may include a step 334 of determining if the RFID value corresponds to a component that matches the desired component value for the RFID tag location. Step 334 may be performed by the first processor 258 of the base station 206 and may depend upon the read-related data and the desired configuration data. In the case where the RFID component value is determined to correspond to a component value that matches the desired value, operations 300 may proceed to a step 336 of generating an output that the RFID tag corresponds to a component value that matches the desired value and return to step 310.

In the case where the RFID value is determined not to correspond to a component value that matches the desired value, operations 300 may proceed to a step 338 of generating an output that a part or component at the RFID tag location needs replacement or installation and return to step 310. That is, the output may identify the component corresponding to the component-identifying data if the component-identifying data does not correspond to a component that matches the desired configuration data.

If it is determined at step 310, either by the first processor 258 of the base station 206 or the second processor 240 of the UAV 204, that all RFID tag locations have been read, then operations 300 may proceed to a step 340 of the UAV 204 returning to the base station 206 or associated landing platform. The UAV 204 may return to the base station 206 autonomously or at the direction of the base station 206.

Operations 300 may include a step 342 of generating a final recommendation report 272. Step 342 may be performed by the first processor 258 of the base station 206. The final recommendation report may depend upon the read-related data from the UAV 204 and the desired configuration data received by the base station 206. The final recommendation report 272 may identify which RFID tags 213 correspond to components that match the desired configuration of the aircraft 202, which RFID tags appear to be missing or malfunctioning, and which RFID tags 213 are associated with a component that needs to be inspected, replaced, upgraded, or installed, among others. The final recommendation report 272 may be sent to a user via a display 274 on a computing device or printed on a printer 276, etc.

Operations 300 may end at a step 346 where the UAV 204 and the base station 206 are powered off.

Example 4

This example describes an exemplary output to a user display 274 or printer 276 of an aircraft survey report 272, see FIG. 4.

FIG. 4 is an exemplary user display, generally indicated at 400, which may include an output or aircraft configuration report 402 to a user depicting exemplary results of an aircraft survey. User display 400 may be generated during operations 300 described in reference to FIG. 3, and/or by any of the aircraft survey systems 100 or 200 described herein.

The aircraft configuration report 402 may depend upon the surveyed configuration of an aircraft and a desired configuration of the aircraft. The surveyed configuration may be determined by an aircraft survey system 100 or 200 including a UAV 102 or 204 and a base station 104 or 206, where the UAV 102 or 204 is configured to retrieve read-related data from one or more RFID tags 120 or 213 at one or more RFID tag locations on the aircraft 106 or 202. The read-related data may include component-identifying data corresponding to an identity of a component installed on the aircraft 106 or 202. The desired configuration data may correspond to required or requested components for the aircraft 106 or 202.

The aircraft configuration report 402 may include an aircraft information field 404, a first list 406 of compliant components or parts found, and a second list 408 of non-compliant components or parts not responding. The aircraft information field 404 may include a model-type 410 for the aircraft 106 or 202 and a tail number 412 for the aircraft 106 or 202. The aircraft information may be determined by the UAV 102 or 204 or the base station 104 or 206 of the aircraft survey system 100 or 200, or may be input to the aircraft survey system 100 or 200 by a user.

The first list 406 of compliant components may include a list of currently installed parts, components, systems, or assemblies where the installed part, component, system, or assembly matches the desired part, component, system or assembly. For the components listed in the first list 406 no action may be required by a user. The first list 406 may be generated, at least in part, at step 336 in operations 300 described in Example 3. The first list 406 may include the names of components, serial numbers, or any other means of identifying specific aircraft components.

The second list 408 of noncompliant components may include a list of installed parts, components, systems, or assemblies where the installed part, component, system, or assembly, does not match the desired part, component, system, or assembly. The installed component may not match the desired component for a variety of reasons, including but not limited to: the installed component is not recognized by the aircraft survey system 100 or 200, the installed component is recognized but known to be obsolete, the installed component is not the correct component, there does not appear to be an installed component at the desired location, or the RFID tag 120 or 213 associated with a component is absent or malfunctioning. The second list may include the names of components, serial numbers, or any other means of identifying specific aircraft components. The second list may display information relating to the installed component, the desired component, or both the installed and desired components. For example, the base-station controller 258 (or the base station 104 of aircraft survey system 100 or base station 206 of aircraft survey system 200) may generate an output for a display device 274 to alert an operator and to display instructions to the operator for replacement of the installed component with the desired component.

The aircraft configuration report 402 may include one or more recommendations 414. The specific recommendations may depend on the kind of discrepancy between the installed component and the desired component. Exemplary recommendations include but are not limited to, recommending inspection, recommending an upgrade, and recommending installation.

The aircraft configuration report 402 may be presented to a user on a screen or other display 274 of a computing device, may be printed on a printer 276, or sent as an electronic message to a remote computer to which a user has access.

Example 5

This example describes an exemplary data processing system, see FIG. 5. As shown in FIG. 5, this example is a data processing system 500 in accordance with aspects of the present disclosure. In this example, data processing system 500 is an illustrative data processing system suitable for implementing aspects of an aircraft survey system 100 or 200 and/or related methods and computer program products. More specifically, in some examples, devices that are embodiments of data processing systems (e.g., smartphones, tablets, personal computers) may include an unmanned aerial vehicle 102 or 204, a base station 104 or 206, and a database 264.

In this illustrative example, data processing system 500 includes communications framework 502. Communications framework 502 provides communications between a processor unit 504, a memory 506, a persistent storage 508, a communications unit 510, an input/output (I/O) unit 512, and a display 514. Memory 506, persistent storage 508, communications unit 510, input/output (I/O) unit 512, and display 514 are examples of resources accessible by processor unit 504 via communications framework 502.

Processor unit 504 serves to run instructions that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and other suitable information either on a temporary basis or a permanent basis.

Storage devices 516 also may be referred to as computer-readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output (I/O) unit 512 allows for input and output of data with other devices that may be connected to data processing system 500. For example, input/output (I/O) unit 512 may provide a connection for user input through a keyboard, a mouse, and/or some other suitable input device. Further, input/output (I/O) unit 512 may send output to a printer. Display 514 provides a mechanism to display information to a user.

Instructions for the operating system, applications, and/or programs may be located in storage devices 516, which are in communication with processor unit 504 through communications framework 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may be computer-readable storage media 524 or computer-readable signal media 526.

Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

In these examples, computer-readable storage media 524 is a physical or tangible storage device used to store program code 518 rather than a medium that propagates or transmits program code 518. Computer-readable storage media 524 is also referred to as a computer-readable tangible storage device or a computer-readable physical storage device. In other words, computer-readable storage media 524 is non-transitory.

Alternatively, program code 518 may be transferred to data processing system 500 using computer-readable signal media 526. Computer-readable signal media 526 may be, for example, a propagated data signal containing program code 518. For example, computer-readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer-readable signal media 526 for use within data processing system 500. For instance, program code stored in a computer-readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in Fig. YY can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications framework 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in communications framework 502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 6

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An aircraft survey system for determining information about an aircraft, comprising:

an unmanned aerial vehicle (UAV) having a radio-frequency identification (RFID) reader, a UAV controller, and a UAV transceiver, the RFID reader being configured to read an RFID tag supported on the aircraft at an identified location and having aircraft-related identifying data, the UAV controller configured to receive an RFID tag location map for the aircraft and generate navigation signals based at least in part on the RFID tag location map for navigating proximate to the identified location, and the UAV transceiver configured to communicate with the UAV controller and receive and transmit data wirelessly; and a base station including a communication system, a base-station controller operatively coupled to the communication system, and a data storage device operatively coupled to the base-station controller, the communication system configured to communicate wirelessly with the UAV, the base-station controller configured to receive and transmit to the UAV the RFID tag location map for the aircraft, receive read-related data from the UAV, the read-related data including aircraft-related identifying data when the RFID tag is at the RFID tag location, and determine from the received read-related data information about the aircraft.

A2. The survey system of paragraph A1, where the aircraft-related identifying data includes component-identifying data corresponding to a component installed on the aircraft, and wherein the base-station controller is further configured to receive desired configuration data for the aircraft, and determine whether the component-identifying data received from the UAV corresponds to a component that matches the desired configuration data.

A3. The survey system of paragraph A2, wherein the base-station controller is further configured to generate an output identifying the component if the aircraft-related identifying data includes component-identifying data corresponding to a component that does not match the desired configuration data.

A4. The survey system of paragraph A2, wherein the UAV controller is configured to transmit to the base station read-related data indicating that no component-identifying data was read at the RFID tag location when the RFID reader receives no component-identifying data at the RFID tag location, and the base-station controller is further configured to generate an output identifying the desired configuration data for the RFID tag location.

A5. The survey system of paragraph A1, where the RFID tag location map includes a plurality of RFID tag locations, and wherein the UAV controller is further configured to generate navigation signals based at least in part on the received RFID tag location map appropriate for controlling navigation of the UAV to the plurality of RFID tag locations sequentially, and transmit read-related data to the base station for each of the RFID tag locations to which the UAV navigated.

A6. The survey system of paragraph A5, wherein the base-station controller is further configured to receive desired configuration data for each RFID tag location on the aircraft, determine whether the aircraft-related identifying data received from the UAV matches the desired configuration data, and generate an output identifying the component if the aircraft-related identifying data includes component-identifying data that corresponds to a component that does not match the desired configuration data.

A7. The survey system of paragraph A6, wherein the UAV controller is configured to transmit to the base station read-related data indicating that no component-identifying data was read at one of the plurality of RFID tag locations when the RFID reader receives no component-identifying data at the one RFID tag location, and the base-station controller is further configured to generate an output identifying the desired configuration data for the one RFID tag location.

A8. The survey system of paragraph A1, wherein the UAV further includes a visible-light camera, and the UAV controller is configured to navigate along the aircraft, control the camera to record an image of at least a portion of the aircraft having aircraft identification indicia, and transmit image signals representative of the image to the base station, and the base-station controller is configured to identify the model and registration number of the aircraft from the image signals received from the UAV.

A9. The survey system of paragraph A1, where the aircraft-related identifying data includes model-type identifying data associated with an aircraft model type, and wherein the base-station controller is further configured to determine the model type of the aircraft from the model-type identifying data.

B1. A method for determining information about an aircraft, comprising:

receiving at a base station an RFID tag location map for the aircraft;

transmitting to an unmanned aerial vehicle (UAV) the RFID tag location map for the aircraft;

generating navigation signals by the UAV based at least in part on the received RFID tag location map appropriate for controlling navigation of the UAV proximate to an RFID tag supported on the aircraft at an RFID tag location, the RFID tag having aircraft-related identifying data;

receiving by the base station read-related data from the UAV, the read-related data including aircraft-related identifying data when the RFID tag is at the RFID tag location; and determining at the base station from the received read-related data information about the aircraft.

B2. The method of paragraph B1, where the aircraft-related identifying data includes component-identifying data corresponding to a component installed on the aircraft, the method further comprising receiving by the base station desired configuration data for the aircraft, and determining by the base station whether the aircraft-related identifying data received from the UAV includes component-identifying data that corresponds to a component that matches the desired configuration data.

B3. The method of paragraph B2, further comprising generating by the base station an output identifying the component if the aircraft-related identifying data includes component-identifying data corresponding to a component that does not match the desired configuration data.

B4. The method of paragraph B2, wherein receiving read-related data includes receiving read-related data indicating that no component-identifying data was read at the RFID tag location, the method further comprising generating by the base-station an output identifying the desired configuration data for the RFID tag location when the read-related data indicates that no component-identifying data was read at the RFID tag location.

B5. The method of paragraph B1, where the RFID tag location map includes a plurality of RFID tag locations, and wherein generating navigation signals includes generating navigation signals based at least in part on the stored RFID tag location map appropriate for controlling navigation of the UAV to the plurality of RFID tag locations sequentially, and receiving read-related data includes receiving read-related data from the UAV for each of the plurality of RFID tag locations.

B6. The method of paragraph B5, further comprising receiving desired configuration data for each of the plurality of RFID tag locations, determining whether the read-related data received from the UAV includes component-identifying data corresponding to a component that matches the desired configuration data, and generating an output identifying the component to which the component-identifying data corresponds if the component-identifying data does not match the desired configuration data.

B7. The method of paragraph B6, wherein receiving the read-related data includes receiving read-related data indicating that no component-identifying data was read at one of the plurality of RFID tag locations, and generating an output includes generating an output identifying the desired configuration data for the one RFID tag location.

B8. The method of paragraph B1, where the UAV further includes a visible-light camera, and wherein generating navigation signals includes generating navigation signals appropriate for navigating the UAV along the aircraft and control signals appropriate for controlling operation of the camera to record an image of at least a portion of the aircraft having aircraft identification indicia, the method further comprising receiving by the base station from the UAV image signals representative of the image of at least a portion of the aircraft, and determining the model and registration number of the aircraft from the image signals received from the UAV.

B9. The method of paragraph B1, where the aircraft-related identifying data includes model-type identifying data representative of a model type of the aircraft, and wherein determining information about the aircraft includes determining the model type of the aircraft from the model-type identifying data received from the UAV.

C1. A computer program product, comprising:
a first computer readable storage medium having a first set of computer readable program instructions embodied therewith and a second computer readable storage medium having a second set of computer readable program instructions embodied therewith, the first set of computer readable program instructions, when executed by a first processor of a base station, configuring the base station to:
receive an RFID tag location map for the aircraft;
transmit the RFID tag location map for the aircraft to an unmanned aerial vehicle (UAV);
receive read-related data from the UAV, the read-related data including aircraft-related identifying data when an RFID tag is at an RFID tag location; and
determine from the received read-related data information about the aircraft; and
the second set of computer readable program instructions, when executed by a second processor of the UAV, configuring the UAV to:
receive the RFID tag location map from the base station; and
generate navigation signals based at least in part on the received RFID tag location map appropriate for controlling navigation of the UAV proximate to an RFID tag supported on the aircraft at an RFID tag location, the RFID tag having the aircraft-related identifying data.

C2. The computer program product of paragraph C1, where the aircraft-related identifying data includes component-identifying data corresponding to a component installed on the aircraft, and wherein the first set of computer readable program instructions, when executed by the first processor, further configure the base station to receive desired configuration data for the aircraft, and determine whether the aircraft-related identifying data received from the UAV includes component-identifying data that corresponds to a component that matches the desired configuration data.

C3. The computer program product of paragraph C2, wherein the first set of computer readable program instructions, when executed by the first processor, further configure the base station to generate an output identifying the component if the aircraft-related identifying data includes component-identifying data corresponding to a component that does not match the desired configuration data.

C4. The computer program product of paragraph C2, wherein the first set of computer readable program instructions, when executed by the first processor, further configure the base station to receive read-related data indicating that no component-identifying data was read at the RFID tag location, and generate an output identifying the desired configuration data for the RFID tag location when the read-related data indicates that no component-identifying data was read at the RFID tag location.

C5. The computer program product of paragraph C1, where the RFID tag location map includes a plurality of RFID tag locations, and wherein the second set of computer readable program instructions, when executed by the second processor, further configure the second processor to generate navigation signals based at least in part on the stored RFID tag location map appropriate for controlling navigation of the UAV to the plurality of RFID tag locations sequentially, and the first set of computer readable program instructions, when executed by the first processor, further configure the base station to receive read-related data from the UAV for each of the plurality of RFID tag locations.

C6. The computer program product of paragraph C5, wherein the first set of computer readable program instructions, when executed by the first processor, further configure the base station to receive desired configuration data for each of the plurality of RFID tag locations, determine whether the read-related data received from the UAV includes component-identifying data corresponding to a component that matches the desired configuration data, and generate an output identifying the component to which the component-identifying data corresponds if the component-identifying data does not match the desired configuration data.

C7. The computer program product of paragraph C6, wherein the first set of computer readable program instructions, when executed by the first processor, further configure the base station to receive read-related data indicating that no component-identifying data was read at one of the plurality of RFID tag locations, and generate an output identifying the desired configuration data for the one RFID tag location.

C8. The computer program product of paragraph C1, where the UAV further includes a visible-light camera, and wherein the second set of computer readable program instructions, when executed by the second processor, further configure the second processor to generate navigation signals appropriate for navigating the UAV along the aircraft and control signals appropriate for controlling operation of the camera to record an image of at least a portion of the aircraft having aircraft identification indicia, and wherein the first set of computer readable program instructions, when executed by the first processor, further configure the first processor to receive from the UAV image signals representative of the image of at least a portion of the aircraft, and determine the model and registration number of the aircraft from the image signals received from the UAV.

C9. The computer program product of paragraph C1, where the aircraft-related identifying data includes model-type identifying data representative of a model type of the aircraft, and wherein the first set of computer readable program instructions, when executed by the first processor, further configure the first processor to determine the model type of the aircraft from the model-type identifying data received from the UAV.

Advantages, Features, Benefits

The different embodiments of the aircraft survey system and related methods and computer program products described herein provide several advantages over known solutions for determining the as-built configuration of an aircraft. For example, the illustrative embodiments described herein allow for automated survey of the installed components of an aircraft. Additionally, and among other benefits, illustrative embodiments described herein allow a survey of an aircraft to be performed without dismantling any part of the aircraft. No known system or device can perform these functions, in particular in an efficient process with a small likelihood of error. However, not all embodiments described herein provide the same advantages or the same degree of advantage.

Conclusion

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. An aircraft survey system for determining information about an aircraft, comprising:
an unmanned aerial vehicle (UAV) having a radio-frequency identification (RFID) reader, a UAV controller, and a UAV transceiver, the RFID reader being configured to read an RFID tag supported on the aircraft at an identified location and having aircraft-related identifying data, the UAV controller configured to receive an RFID tag location map for the aircraft and generate navigation signals based at least in part on the RFID tag location map for navigating proximate to the identified location, and the UAV transceiver configured to communicate with the UAV controller and receive and transmit data wirelessly; and
a base station including a communication system, a base-station controller operatively coupled to the communication system, and a data storage device operatively coupled to the base-station controller, the communication system configured to communicate wirelessly with the UAV, the base-station controller configured to receive and transmit to the UAV the RFID tag location map for the aircraft, receive read-related data from the UAV, the read-related data including aircraft-related identifying data when the RFID tag is at the RFID tag location, and determine from the received read-related data information about the aircraft.

2. The survey system of claim 1, where the aircraft-related identifying data includes component-identifying data corresponding to a component installed on the aircraft, and wherein the base-station controller is further configured to receive desired configuration data for the aircraft, and determine whether the component-identifying data received from the UAV corresponds to a component that matches the desired configuration data.

3. The survey system of claim 2, wherein the base-station controller is further configured to generate an output identifying the component if the aircraft-related identifying data includes component-identifying data corresponding to a component that does not match the desired configuration data.

4. The survey system of claim 2, wherein the UAV controller is configured to transmit to the base station read-related data indicating that no component-identifying data was read at the RFID tag location when the RFID reader receives no component-identifying data at the RFID tag location, and the base-station controller is further configured to generate an output identifying the desired configuration data for the RFID tag location.

5. The survey system of claim 1, where the RFID tag location map includes a plurality of RFID tag locations, and wherein the UAV controller is further configured to generate navigation signals based at least in part on the received RFID tag location map appropriate for controlling navigation of the UAV to the plurality of RFID tag locations sequentially, and transmit read-related data to the base station for each of the RFID tag locations to which the UAV navigated.

6. The survey system of claim 5, wherein the base-station controller is further configured to receive desired configuration data for each RFID tag location on the aircraft, determine whether the aircraft-related identifying data received from the UAV corresponds to a component that matches the desired configuration data, and generate an output identifying the component if the aircraft-related identifying data includes component-identifying data that corresponds to a component that does not match the desired configuration data.

7. The survey system of claim 6, wherein the UAV controller is configured to transmit to the base station read-related data indicating that no component-identifying data was read at one of the plurality of RFID tag locations when the RFID reader receives no component-identifying data at the one RFID tag location, and the base-station controller is further configured to generate an output identifying the desired configuration data for the one RFID tag location.

8. The survey system of claim 1, wherein the UAV further includes a visible-light camera, and the UAV controller is configured to navigate along the aircraft, control the camera to record an image of at least a portion of the aircraft having aircraft identification indicia, and transmit image signals representative of the image to the base station, and the base-station controller is configured to identify the model and registration number of the aircraft from the image signals received from the UAV.

9. A method for determining information about an aircraft, comprising:
   receiving at a base station an RFID tag location map for the aircraft;
   transmitting to an unmanned aerial vehicle (UAV) the RFID tag location map for the aircraft;
   generating navigation signals by the UAV based at least in part on the received RFID tag location map appropriate for controlling navigation of the UAV proximate to an RFID tag supported on the aircraft at an RFID tag location, the RFID tag having aircraft-related identifying data;
   receiving by the base station read-related data from the UAV, the read-related data including aircraft-related identifying data when the RFID tag is at the RFID tag location; and
   determining at the base station from the received read-related data information about the aircraft.

10. The method of claim 9, where the aircraft-related identifying data includes component-identifying data corresponding to a component installed on the aircraft, the method further comprising receiving by the base station desired configuration data for the aircraft, and determining by the base station whether the aircraft-related identifying data received from the UAV includes component-identifying data that corresponds to a component that matches the desired configuration data.

11. The method of claim 10, further comprising generating by the base station an output identifying the component if the aircraft-related identifying data includes component-identifying data corresponding to a component that does not match the desired configuration data.

12. The method of claim 10, wherein receiving read-related data includes receiving read-related data indicating that no component-identifying data was read at the RFID tag location, the method further comprising generating by the base-station an output identifying the desired configuration data for the RFID tag location when the read-related data indicates that no component-identifying data was read at the RFID tag location.

13. The method of claim 9, where the RFID tag location map includes a plurality of RFID tag locations, and wherein generating navigation signals includes generating navigation signals based at least in part on the stored RFID tag location map appropriate for controlling navigation of the UAV to the plurality of RFID tag locations sequentially, and receiving read-related data includes receiving read-related data from the UAV for each of the plurality of RFID tag locations.

14. The method of claim 13, further comprising receiving desired configuration data for each of the plurality of RFID tag locations, determining whether the read-related data received from the UAV includes component-identifying data corresponding to a component that matches the desired configuration data, and generating an output identifying the component to which the component-identifying data corresponds if the component-identifying data does not match the desired configuration data.

15. The method of claim 14, wherein receiving the read-related data includes receiving read-related data indicating that no component-identifying data was read at one of the plurality of RFID tag locations, and generating an output includes generating an output identifying the desired configuration data for the one RFID tag location.

16. The method of claim 9, where the UAV further includes a visible-light camera, and wherein generating navigation signals includes generating navigation signals appropriate for navigating the UAV along the aircraft and control signals appropriate for controlling operation of the camera to record an image of at least a portion of the aircraft having aircraft identification indicia, the method further comprising receiving by the base station from the UAV image signals representative of the image of at least a portion of the aircraft, and determining the model and registration number of the aircraft from the image signals received from the UAV.

17. The method of claim 9, where the aircraft-related identifying data includes model-type identifying data representative of a model type of the aircraft, and wherein determining information about the aircraft includes determining the model type of the aircraft from the model-type identifying data received from the UAV.

18. A computer program product, comprising:
   a first computer readable storage medium having a first set of computer readable program instructions embodied therewith and a second computer readable storage medium having a second set of computer readable program instructions embodied therewith, the first set of computer readable program instructions, when executed by a first processor of a base station, configuring the base station to:
   receive an RFID tag location map for the aircraft;
   transmit the RFID tag location map for the aircraft to an unmanned aerial vehicle (UAV);
   receive read-related data from the UAV, the read-related data including aircraft-related identifying data when an RFID tag is at an RFID tag location; and
   determine from the received read-related data information about the aircraft; and
   the second set of computer readable program instructions, when executed by a second processor of the UAV, configuring the UAV to:
   receive the RFID tag location map from the base station; and
   generate navigation signals based at least in part on the received RFID tag location map appropriate for controlling navigation of the UAV proximate to an RFID tag supported on the aircraft at an RFID tag location, the RFID tag having the aircraft-related identifying data.

19. The computer program product of claim 18, where the aircraft-related identifying data includes component-identifying data corresponding to a component installed on the aircraft, and wherein the first set of computer readable program instructions, when executed by the first processor, further configure the base station to receive desired configuration data for the aircraft, and determine whether the component-identifying data received from the UAV corresponds to a component that matches the desired configuration data.

20. The computer program product of claim 18, where the UAV further includes a visible-light camera, and wherein the second set of computer readable program instructions, when executed by the second processor, further configure the second processor to generate navigation signals appropriate for navigating the UAV along the aircraft and control signals appropriate for controlling operation of the camera to record an image of at least a portion of the aircraft having aircraft identification indicia, and wherein the first set of computer readable program instructions, when executed by the first processor, further configure the first processor to receive from the UAV image signals representative of the image of at least a portion of the aircraft, and determine the model and registration number of the aircraft from the image signals received from the UAV.

* * * * *